(12) United States Patent
Vazan

(10) Patent No.: US 6,753,897 B2
(45) Date of Patent: Jun. 22, 2004

(54) ADAPTIVE LIGHT EMITTING DIODE BAR EQUALIZATION

(75) Inventor: Shahriar Vazan, Northrich, CA (US)

(73) Assignee: Xerox Corporation, Stamford, CT (US)

( * ) Notice: Subject to any disclaimer, the term of this patent is extended or adjusted under 35 U.S.C. 154(b) by 47 days.

(21) Appl. No.: 10/025,464

(22) Filed: Dec. 26, 2001

(65) Prior Publication Data

US 2003/0117484 A1 Jun. 26, 2003

(51) Int. Cl.$^7$ ................................................. B41J 2/435
(52) U.S. Cl. ........................................ 347/237; 347/247
(58) Field of Search ................................ 347/130, 132, 347/135, 236, 237, 238, 246, 247, 253; 369/116; 348/27; 250/205

(56) References Cited

U.S. PATENT DOCUMENTS

| | | | | |
|---|---|---|---|---|
| 4,747,091 A | * | 5/1988 | Doi ............................ | 369/116 |
| 4,780,731 A | * | 10/1988 | Creutzmann et al. ........ | 347/237 |
| 5,166,510 A | * | 11/1992 | Matsubara et al. .......... | 250/205 |
| 5,389,973 A | * | 2/1995 | Kitamura et al. ............. | 348/27 |
| 5,668,587 A | | 9/1997 | Hammond et al. .......... | 347/237 |

* cited by examiner

*Primary Examiner*—Hai Pham
(74) *Attorney, Agent, or Firm*—Phil Virgu; E. D. Palazzo

(57) ABSTRACT

Uniformity of light output from an LED printbar is achieved by current sensing or image sensing of auxiliary LEDs on the LED printbar. A photodetector measures the light output from the auxiliary LEDs and a comparator will compare the auxiliary LED data to determine if the entire LED printbar has to be compensated to make the light output more uniform.

4 Claims, 4 Drawing Sheets

ADAPTIVE LIGHT EMITTING DIODE BAR EQUALIZATION

BACKGROUND OF THE INVENTION

The present invention relates to light emitting diode (LED) printbars such as those used in xerographic or digital printer systems and, more particularly, to an improved apparatus and method for maintaining LED printbar uniformity and equalization throughout the operating life of the printbar.

Printbars which are used in image recording systems are well known in the art. Such printbars are generally comprised of a linear array of discrete, light-emitting sources. Light emitting diode (LED) printbars are commonly used because of their high resolution, which is obtained by arranging a large number of closely spaced LEDs in a linear array. By providing relative motion between the LED printbar and a photoreceptor, and by selectively energizing the LEDs at the proper times, a desired latent electrostatic image can be produced on the photoreceptor. The production of a desired latent image is usually performed by having each LED expose a corresponding pixel on the photoreceptor in accordance with image-defining video data information applied to the printbar through driver circuitry. Conventionally, digital data signals from a data source, which may be a Raster Input Scanner (RIS), a computer, or some other source of digitized image data, is clocked into a shift register. Some time after the start of a line signal, individual LED drive circuits are then selectively energized to control the on/off timing of currents flowing through the LEDs. The LEDs selectively turn on and off to form a line exposure pattern on the surface of the photoreceptor.

The LEDs of most LED printbars are arranged in a linear array of one or more rows. By making the length of a row as long as the image that is to be formed an LED printbar can produce a desired image line by line. Since it is difficult to produce a row of closely spaced LEDs with the required length (for example, 8 to 14 inches) LED chips of smaller lengths are usually butted together and interconnected to act as a single row. If more than one row is used for the LED printbar, the various rows are usually offset in a staggered fashion.

To create high quality images using an LED printbar, each of the LEDs should output the same amount of light when activated. To meet current copy or print quality goals, the printbar light output uniformity must be within plus or minus 1 or 2%. It is known in the prior art to correct printbar LED outputs to this uniformity level during an initial calibration procedure for the LEDs. A correction matrix of light output values for each pixel is created and stored in a memory for the printbar. Those values are downloaded to correction circuitry each time the printer is to be used. The correction circuitry can then compensate for light output differences by controlling an electrical signal, usually the drive current, to the individual LEDs based upon the stored correction values.

While the above initial calibration procedure of achieving light output uniformity is generally successful, the individual LEDs of an LED printbar may have different aging characteristics which can eventually result in unacceptable non-uniformity pixel-to-pixel exposure beyond 1 and 2 percent. One solution to this aging problem is to periodically scan the LED printbar with a photosensor as each LED is individually turned on. The light output from each LED is then measured and, if necessary, the stored correction value for the particular LED is updated to reflect changes in light output. While this system compensates for aging, it is rather expensive and uses valuable space near the photoreceptor.

It is an object of the present invention to provide sensing means to detect and compensate for non-uniform light output from a LED printbar.

It is another object of the present invention to provide more than one set of correction data to control the LED printbar to compensate for non-uniform light output from the LED printbar.

SUMMARY OF THE INVENTION

According to the present invention, uniformity of light output from an LED printbar is achieved by current sensing or image sensing of auxiliary LEDs on the LED printbar. Initial correction data for the LED printbar is determined and stored in a correction memory. The contents of the correction memory are used to control the illumination of each of the LEDs in the printbar. Periodically, a photodetector measures the light output from the auxiliary LEDs and a comparator will compare the auxiliary LED output power data. The comparator will signal for new correction data in the correction memory to be used to control the illumination of each of the LEDs in the printbar and compensate for aging by providing more uniform light output.

The current sensing method will have the driving current for the LED printbar digitalized by an A/D converter, then shuffled to drive the auxiliary LEDs.

The image sensing method will have a line of data for the LED printbar, scaled and quantized, then shuffled to drive the auxiliary LEDs.

Other objects and attainments together with a fuller understanding of the invention will become apparent and appreciated by referring to the following description and claims taken in conjunction with the accompanying drawings.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

DESCRIPTION OF THE INVENTION

In the following detailed description, numeric ranges are provided for various aspects of the embodiments described. These recited ranges are to be treated as examples only, and are not intended to limit the scope of the claims hereof. In addition, a number of materials are identified as suitable for various facets of the embodiments. These recited materials are to be treated as exemplary, and are not intended to limit the scope of the claims hereof. In addition, the figures are not drawn to scale for ease of understanding the present invention.

Figure 1:
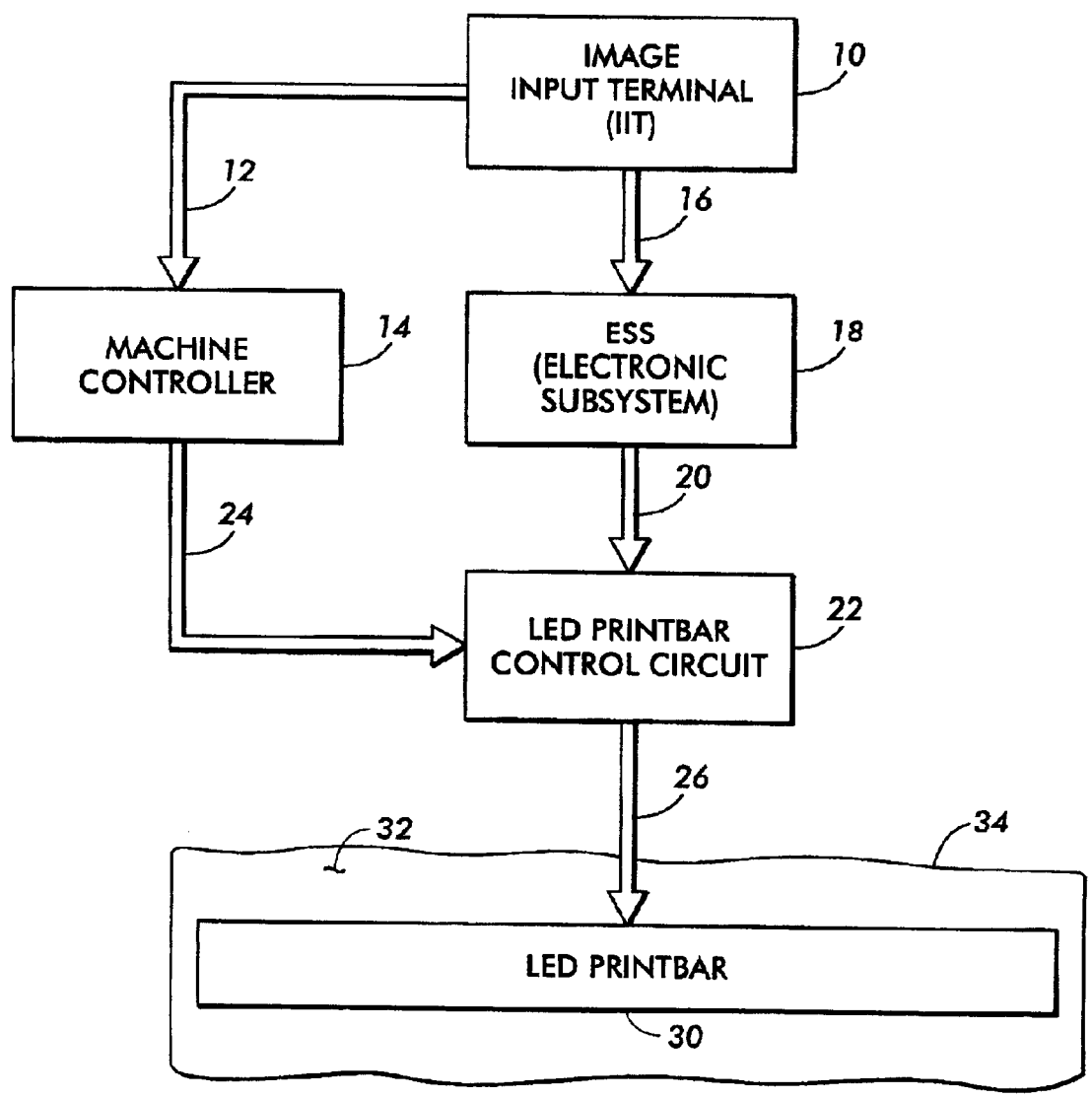
FIG. 1 is a block diagram for a data flow architecture for a LED printbar in accordance with the present invention

Reference is now made to FIG. 1 which illustrates the data flow architecture that is used to control the printbar operation of a typical LED printer. A digital representation of an image to be printed is output from an image input terminal (IIT) 10 over a bus 12 to a machine controller 14 and over a bus 16 to an electronic subsystem (ESS) 18. The image input terminal may take the form of a Raster Input Scanner (RIS), a computer, or some other source of digitized image data. Based upon the data received and upon an operating mode selected by an operator, the machine controller 14 controls various user interfaces and the general operation of the LED printer, including positioning a photoreceptor relative to a printbar. The image signals applied to the ESS 18 are processed and stored in a predetermined format which is suitable for use when printing an image. As required, the ESS outputs digital image signals over a bus 20 to an LED printbar control circuit 22. Additionally, digital signals are fed over a bus 24 from the machine controller 14 to the LED printbar control circuit 22 to inform the LED printbar control circuit about the relative positions of an LED printbar to a photoreceptor.

Based upon the data represented by the applied digital image signals from the ESS, the LED Printbar Control Circuit 22 performs further image processing, print data signal generation, strobe generation, and, as is subsequently described, exposure level control adjustments which correct for pixel-to-pixel uniformity. The LED printbar control circuit outputs print data signals, strobe signals, and as is subsequently explained, correction data signals, over a bus 26 to a printbar 30. The print data signals are used to select the individual LED's of the printbar which are to illuminate the surface 32 of a photoreceptor 34. The strobe signals are used to synchronize the illumination positions with the relative motion of the photoreceptor. The correction data signals are used to normalize and make uniform pixel exposure.

Figure 2:
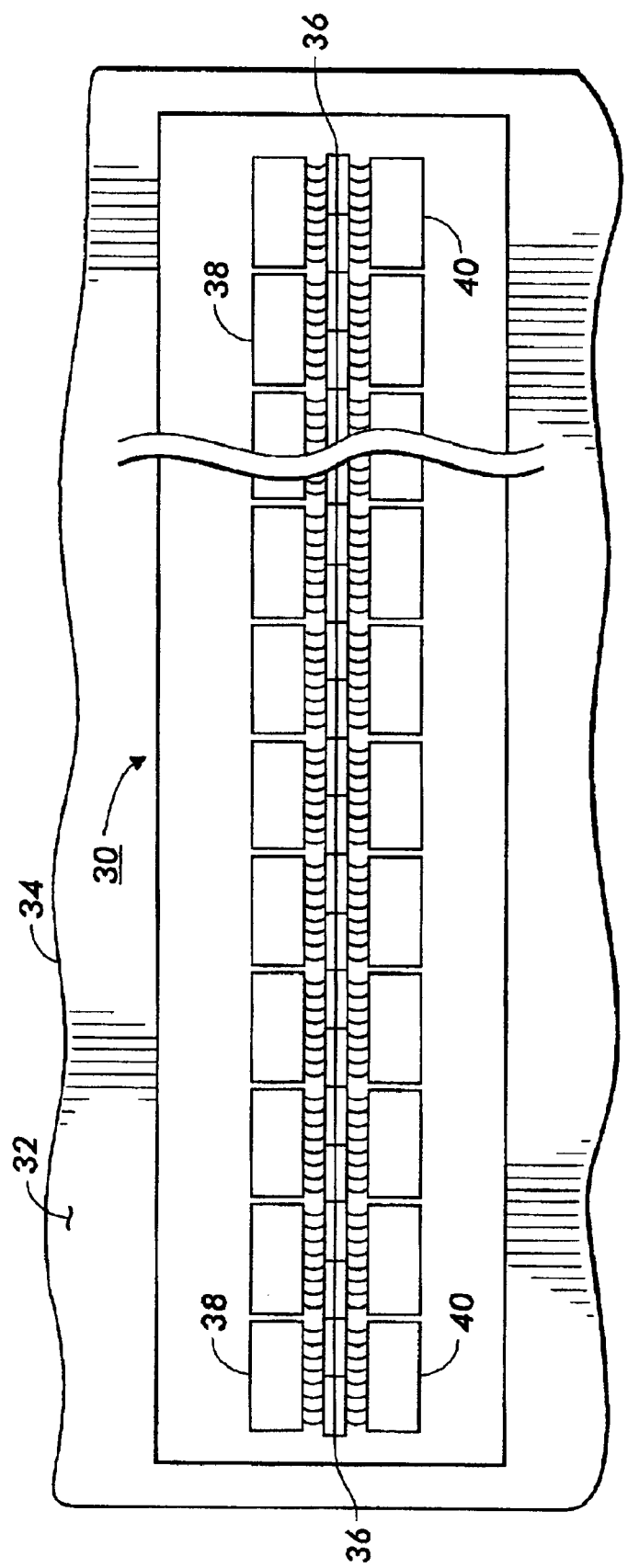
FIG. 2 is a top view of a LED printbar in accordance with the present invention.

Referring now to FIG. 2, the printbar 30 comprises a suitable support with a series of LED chips 36 mounted thereon. For this example, there are thirty-two LED chips, with each chip having 128 LED's Thus the printbar has a total of 4,096 LEDs. Each LED has a particular, approximately linear, response to input drive current. The LED chips 36 are arranged end-to-end in a row across the width of the photoreceptor 34. For each pair of LED chips, there is provided an LED Current Driver Network 38 and a Logic Network 40. Among other things, the Logic Network decodes the print data signals from the LED printbar control circuit to determine which LED is to turn on while the LED Current Driver Network drives each LED at the proper time with the proper drive current.

Figure 3:
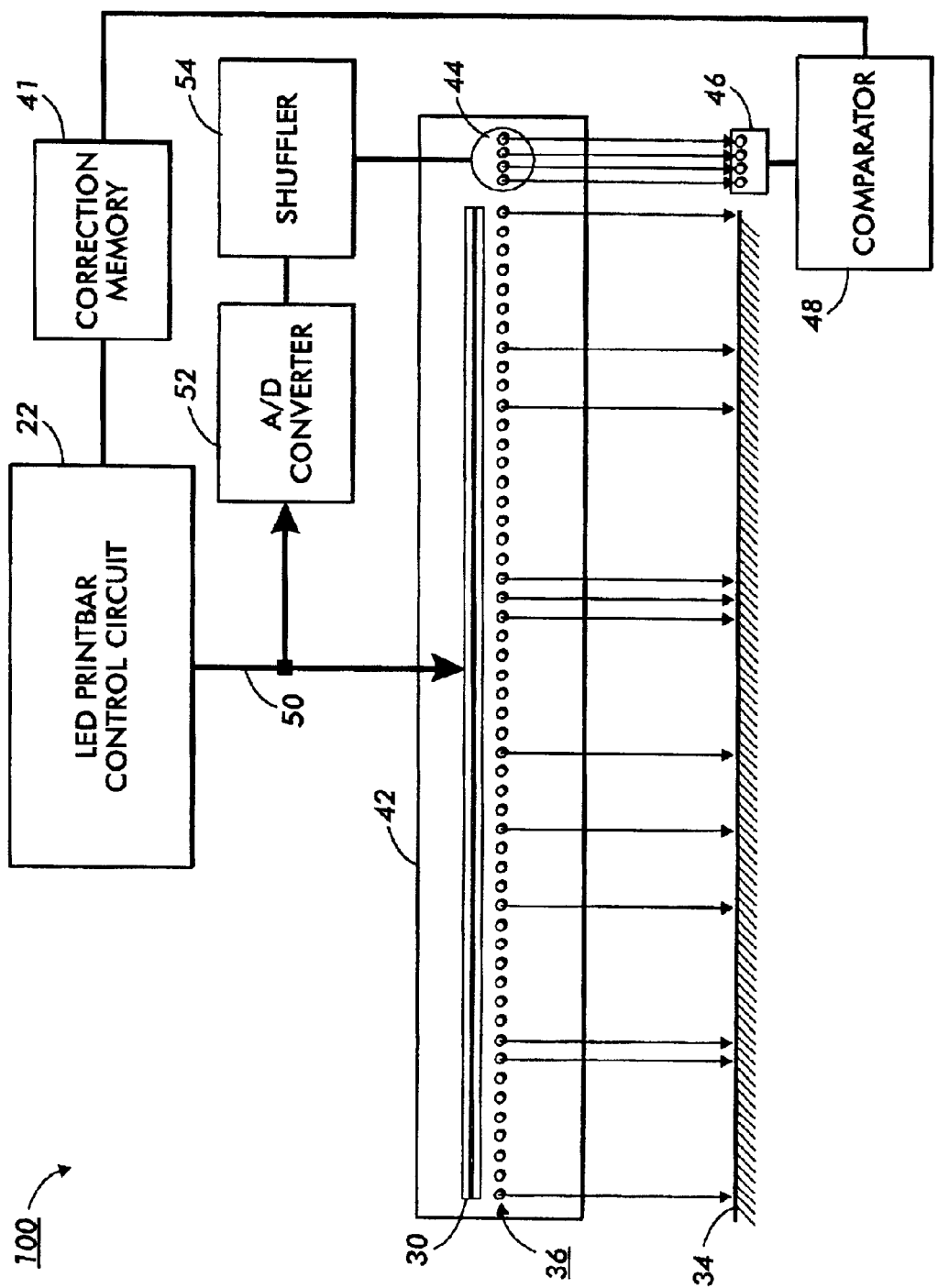
FIG. 3 is a block diagram for current sensing for a LED printbar in accordance with the present invention.
Figure 4:
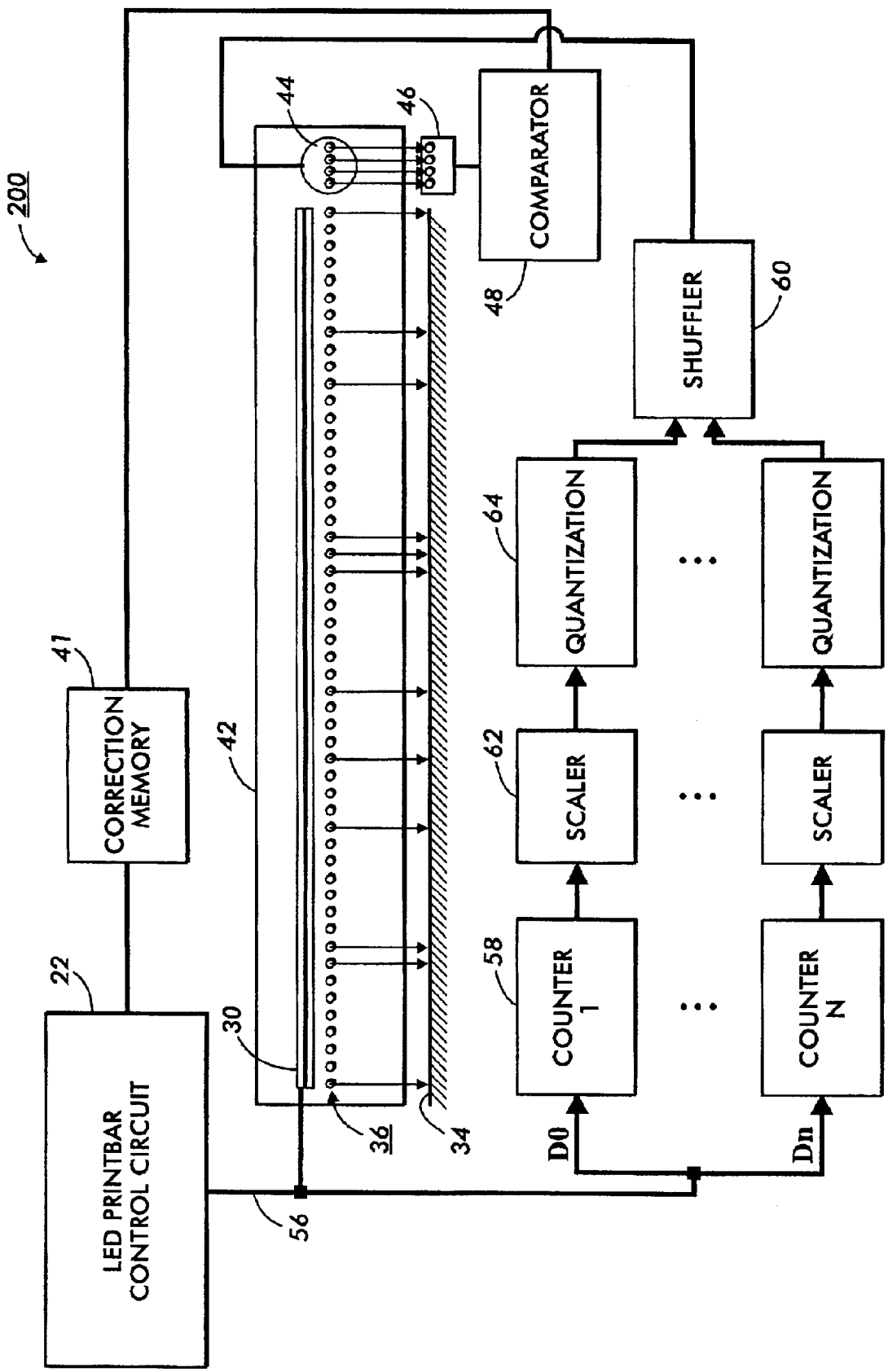
FIG. 4 is a block diagram for image sensing for a LED printbar in accordance with the present invention.

Both the current sensing method 100 of FIG. 3 and the image sensing method 200 of FIG. 4 provide for uniform light output from the LED printbar 30 in accordance with the present invention. During an initial calibration, the light outputs of the various LEDs which comprise the printbar 30 are measured. From those measurements, a first set of correction data to normalize the light output of each LED is determined and stored in a correction memory 41. By normalize, it is meant that each LED outputs the same light intensity as the other LEDs in the printbar. At a suitable time, usually at machine power up, the first set of stored correction values is downloaded from correction memory 41 into the LED printbar control circuit 22. The first set of correction data is used to select the current levels that are to be applied to the individual LEDs so that each LED outputs the same light intensity. When the relative position of the printbar 30 and the photoreceptor 34 is correct for a given line of data, the strobe signal causes the LED Printbar Control Circuit 22 to drive each of the LEDs of the printbar 30.

The correction memory 41 also contains multiple sets of stored correction values for increasing various power levels so that, as the LEDs age, each LED outputs the same light intensity Aging of the LEDs is main source of loss of light uniformity at the photoreceptor. The average aging of the LEDs is a function of time and usage. The output power diminishes due to the lower efficiency of the electron/hole combination and recombination process in each LED. To compensate for these phenomena, the aging process of the printbar is monitored. As the output power of the LEDs within the printbar degrades to certain thresholds, a different set of correction values corresponding to higher output level will be loaded into the printbar to compensate.

The printbar 30 consists of two sections of LEDs, a first section 42 of imaging LEDs to illuminate the photoreceptor 34 and a second section 44 of auxiliary LEDs to illuminate a photodetector 46. The number of auxiliary LEDs will be a small percentage of the number of imaging LEDs.

The auxiliary LED section 44 is used to compute the average light output of all the LEDs in the active LED printbar 42. The auxiliary LEDs 44 will receive and illuminate data at a line rate similar to the active printbar 42. The auxiliary LEDs 44 will not illuminate the photoreceptor 34. The auxiliary LEDs 44 will illuminate a photodetector 46.

The photodetector 46 will at periodic opportune times measure the light output from the auxiliary LEDs 44. The measured light output data will be input to a comparator 48 which will compare the auxiliary LED output power data with the desired uniform power output (within 1 or 2 percent deviation). As the auxiliary LEDs measured values change with aging, the comparator 48 will signal the correction memory 41 to load a second (or subsequent) different sets of correction values into the LED printbar control circuit 22 for the entire printbar 30, both the active printbar 42 and the auxiliary LEDs 44, to compensate for the loss of output power from the LEDs. This correction process is then repeated throughout the LED printbar's useful life.

The first embodiment of FIG. 3 shows a current sensing method 100 to provide uniform output power from the LED printbar with different sets of correction values loaded into the LED printbar control circuit 22 to compensate for the loss of output power from the LEDs.

The average aging of the LEDs in the printbar 30 is directly proportional to the "on time" of the LEDs illuminating the photoreceptor 34. The "on time" of the LEDs is directly proportional to the current 50 that drives the LEDs on the printbar 34.

The printbar current 50 from the LED printbar control circuit 22 to the LED printbar 30 will be sensed and digitalized by an A/D converter 52. The digital signals from the A/D converter 52 will be input to a shuffler 54 to insure an even distribution of power and then loaded into the auxiliary LEDs 44 to strobe illuminated with the active printbar. The auxiliary LEDs 44 will illuminate a photodetector 46, as previously described.

The current sensing method provides a mechanism for the auxiliary LEDs to represent all the LEDs within the printbar. At an opportune time, the auxiliary LEDs will be tested under known conditions and output data will be compared with a look-up table to decide on whether a new set of correction data is to be loaded into the LED printbar control circuit.

The digitalized signals from the A/D converter showing power usage for the printbar can be stored in a separate memory (not shown) to provide a power consumption profile of the printbar for diagnostic or failure analysis study.

The current sensing method of FIG. 3 uses current to model the usage of the LEDs in the printbar and the image sensing method of FIG. 4 uses the actual image loaded into the printbar to model the printbar usage using the auxiliary LEDs.

The second embodiment of FIG. 5 shows an image sensing method 200 to provide uniform output power from the LED printbar. Statistical modeling will be used to represent usage of the printbar based on the actual image that flows into the printbar.

The LED printbar control circuit 22 outputs a full data line 56 containing M pixels for the printbar 30. The data line 56 will be monitored in real time as it is loaded into the printbar.

The data line 56 is input to an up/down counter 58 to track the bit streams flowing into the printbar. If the data input 56 to the printbar 30 is serial, then one counter 58 is used. If the data bits loading into the printbar are more than one bit per cycle, then N counters will be used to collect the data line information.

The up/down counter 58 is preloaded to the midrange of its total scale between the data lines 56, and will be incremented or decrement at each clock cycle depending on the input data being a "1" or "0". At the end of each data line 56, the value of the counter 58 represents the number of "on" or "off" pixels will be input to a shuffler 60 to insure an even distribution of power and then loaded into the auxiliary LEDs 44 to strobe illuminated with the active printbar 30. The auxiliary LEDs 44 will illuminate a photodetector 46, as previously described.

In case of parallel loading, where more than one counter 58 is required, the output data of the counters will be scaled 62 and quantized 64 to reduce the data stream. This process scales down the number of output data significantly by increasing the quantization steps, thereby reducing the number of output data while preserving the statistical integrity of the information. The scaled quantized data signals will be input to a shuffler 60 to insure an even distribution of power and then loaded into the auxiliary LEDs 44 to strobe illuminated with the active printbar. The auxiliary LEDs 44 will illuminate a photodetector 46, as previously described. This algorithm provides highly condensed, yet statistically accurate representation of each line of data.

In the simplest image sensing method of 50 percent distribution, auxiliary LEDs will be alternately loaded "1" and "0" and will be turned off and on by the exposure time of the printbar per line of data. The average output power of the auxiliary LEDs is detected at opportune time and processed identical to the image sensing situation.

The output of both schemes, current sensing and image sensing, does not contain spatial relevance to the bar usage. The shuffling process at the end of each line is to alleviate this concern by evenly distributing the power to all of the auxiliary LEDs. One easy way of implementing this concept is to rotate the mapping of the input to the output of the shuffler per line of data by a counter and combination logic circuit (not shown).

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A method for correcting exposure non-uniformities in a printbar having a plurality of individual LEDs, said method comprising:

calibrating said printbar by determining a first set or correction values for each corresponding one of the individual LEDs, storing said first set of correction values and a plurality of sets of correction values in a correction memory, each said correction value being a digital value for causing output of light of a substantially predetermined light intensity from the corresponding one of said individual LEDs;

measuring the light intensity from a predetermined set of individual LEDs of said printbar, comparing said measured light intensity with a uniform light intensity, determining a difference between said measured light intensity and said uniform light intensity, loading one of said plurality of sets of correction values into said printbar, when the determined difference between said measured light intensity and said uniform light intensity exceeds a predetermined maximum difference, forming digital signals from the driving current of said LEDs of said printbar, shuffling said digital signals, and driving said predetermined set of individual LEDs with said shuffled digital signals.

2. The method for correcting exposure non-uniformities in a printbar having a plurality of individual LEDs, said method comprising the steps of:

calibrating said printbar by determining a first set of correction values for each corresponding one of the individual LEDs, storing said first set of correction values and a plurality of sets of correction values in a correction memory, each said correction value being a digital value for causing output of light of a substantially predetermined light intensity from the corresponding one of said individual LEDs;

measuring the light intensity from a predetermined set of individual LEDs of said printbar, comparing said measured light intensity with a uniform light intensity, determining a difference between said measured light intensity and said uniform light intensity, loading one of said plurality of sets of correction values into said printbar, when the determined difference between said measured light intensity and said uniform light intensity exceeds a predetermined maximum difference, up/down counting a line of data for said printbar from a preloaded midrange to form digital signals, scaling and quantizing said digital signals, shuffling said scaled quantized digital signals, and driving said predetermined set of individual LEDs with said shuffled digital signals.

3. An LED printbar comprising:

a plurality of individual LEDs; said plurality of individual LEDs having a first plurality of LEDs to image a photoreceptor and a second plurality of LEDs to image a photodetector, said first plurality of LEDs being larger in number than said second plurality of LEDs;

a current driver having a control input, said current driver for applying a drive current to said plurality of individual LEDs, wherein first drive current is controlled by said control input;

a correction memory for storing a plurality of sets of correction values, said correction memory for applying one of said sets of correction value to said control input;

sensing means for comparing the light output from said second plurality of LEDs at said photodetector to a predetermined light output for loading the appropriate one of said plurality of sets of correction values from said correction memory to said control input, an A/D converter to digital said drive current, and a shuffler to shuffle said digital signals before applying said shuffled digitalized drive current signals to said second plurality of LEDs.

4. An LED printbar comprising:

a plurality of individual LEDs; said plurality of individual LEDs having a first plurality of LEDs to image a photoreceptor and a second plurality of LEDs to image a photodetector, said first plurality of LEDs being larger in number than said second plurality of LEDs;

a current driver having a control input, said current driver for applying a drive current to said plurality of individual LEDs, wherein first drive current is controlled by said control input;

a correction memory for storing a plurality of sets of correction values, said correction memory for applying one of said sets of correction value to said control input;

sensing means for comparing the light output from said second plurality of LEDs at said photodetector to a predetermined light output for loading the appropriate one of said plurality of sets of correction values from said correction memory to said control input, wherein said sensing means comprises an up/down counter for counting a line of data from said digital signals, a scaler and a quantizer to scale and quantize said digital signals, and a shuffler to shuffle said digital signals before applying said shuffled digitalized drive current signals to said second plurality of LEDs.

* * * * *